J. A. HOAR.
VALVE CONSTRUCTION FOR WATER DISTRIBUTION.
APPLICATION FILED MAR. 8, 1919.
1,317,789.
Patented Oct. 7, 1919.
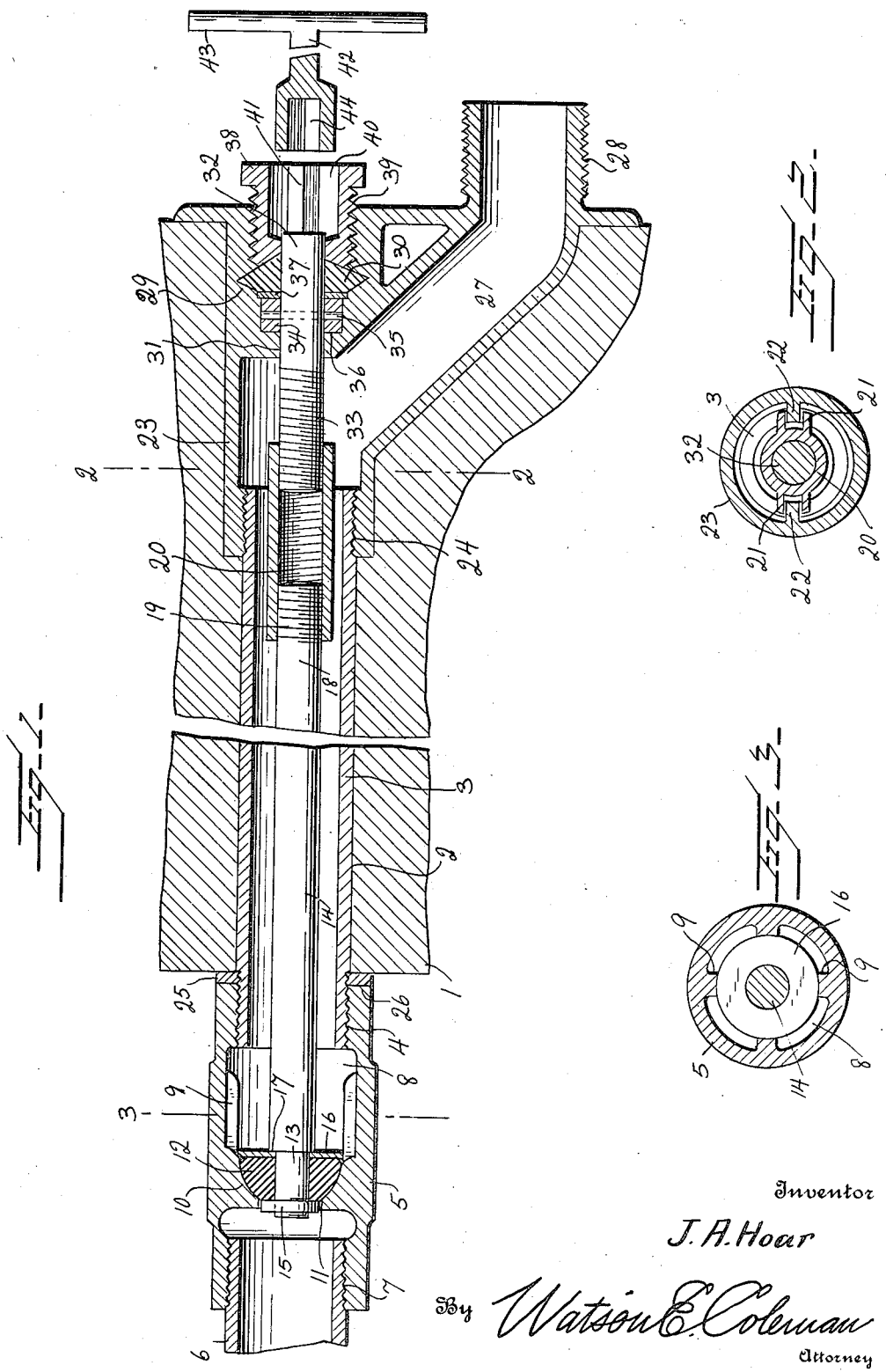
Inventor
J. A. Hoar
By Watson E. Coleman
Attorney

UNITED STATES PATENT OFFICE.

JOHN A. HOAR, OF OSKALOOSA, IOWA.

VALVE CONSTRUCTION FOR WATER DISTRIBUTION.

1,317,789.           Specification of Letters Patent.      Patented Oct. 7, 1919.

Application filed March 8, 1919. Serial No. 281,369.

*To all whom it may concern:*

Be it known that I, JOHN A. HOAR, a citizen of the United States, residing at Oskaloosa, in the county of Mahaska and State of Iowa, have invented certain new and useful Improvements in Valve Construction for Water Distribution, of which the following is a specification, reference being had to the accompanying drawings.
This invention relates to an improved valve structure particularly adapted for use in connection with water distribution, and it is the aim of the invention to provide a device of this kind, which includes a valve located adjacent the inside of the wall, and means adjacent the exterior of the wall for operating the valve, and a connection exteriorly of the wall for the connection of a hose, so that it may be applied from the exterior, whereby the valve may be manipulated from the exterior.

It is the aim of the present invention to provide a simple, efficient and practical valve structure and operating means, arranged as heretofore mentioned, and consequently prevent the water from freezing in the pipe, particularly since the valve proper is adjacent the inner face of the wall, where it derives sufficient heat from the interior of the house to prevent freezing.

The invention further aims to provide a device of this kind in which various novel features of construction are involved. For instance, one of the features of the invention includes a chamber adjacent the inner face of the wall provided with guide ribs, and a semi-spherical valve member coöperating with the valve seat at one end of the chamber and adapted to be guided by the guides, the valve stem is in turn fixedly connected to a sleeve nut, which is mounted in guides, in combination with a swivelly mounted member threaded to the sleeve nut, and manipulated exteriorly of the wall, to open and close the valve.

Another feature of the invention is the provision of improved means, swivelly mounting the member, said means comprising a packing, a jamming member for the packing, and the means proper between a wall of the pipe and the packing for swivelly mounting said member.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a sectional view through a portion of a wall, showing a section of a water distributing pipe mounted transversely therein, and illustrating a valve at one end of the pipe and operating means at the other end exteriorly of the wall.

Fig. 2 is a sectional view on line 2—2 of Fig. 1.

Fig. 3 is a sectional view on line 3—3 of Fig. 1.

Referring more especially to the drawings 1 designates a portion of the wall of a building provided with a transverse opening 2, through which a section 3 of a water distributing pipe is arranged. The inner end of the pipe 3 is threaded as shown at 4, and 5 denotes a tubular casting, which is threaded to the inner end of the pipe 3. A pipe 6 is threaded to the inner end of the casing 5, as shown at 7. The casing 5 is provided with a chamber 8, the wall of which is provided with diametrically oppositely disposed guide ribs 9 arranged at right angles. One end of the chamber terminates in a semi-spherical valve seat 10 which has an adjoining valve opening 11. Mounted in the chamber and retained in a relative position to the seat by means of the guide ribs 9, is a semi-spherical valve 12, that is corresponding to and adapted to engage the valve seat. This valve is secured on a reduced extension 13 of the valve stem 14, by means of a nut 15, which is threaded to the extension 13. A washer 16 is interposed between a shoulder 17 of the valve stem and the valve, thereby not only reinforcing the valve, but owing to it being slightly larger in diameter than the valve, its marginal edge engages the guides 9, and maintains the valve at all times in its proper relative position to its seat. This washer also prevents the valve from frictionally contacting with the ribs, thereby avoiding wear on the valve. The valve stem is of considerable less diameter than the pipe section 3, which is in surrounding relation to the stem. The outer end 18 of the stem has threaded thereto fixedly, as shown at 19, a sleeve nut 20. The outer end portions of the sleeve nut is provided with diametrically oppositely disposed spaced guide flanges 21. Diametrically oppositely displaced flanges 22 are formed integral with the interior of a tubular casting 23. These flanges 22 engage between the flanges 21, thereby preventing rotation of the sleeve nut, but guiding the same when the valve stem is moved longitudinally of the pipe section 3. The tubular casting 23 penetrates the wall of the building partially, and is threaded at 24 to the outer end of the pipe section 3, thereby clamping a washer 25 between the end 26 of the casing 5 and the inner face of the wall of the building. The tubular casting is provided with an outwardly and downwardly arranged tubular extension 27, the portion 28 of which is threaded, and is in parallelism with the body of the casting 23, and to this end portion 28 a suitable watering hose (not shown) may be connected, whereby when the valve is open, the water flowing through the pipe in the interior of the building will pass through the pipe section 3 and escape through the downwardly and outwardly disposed extension 27. The outer portion of the casting 23 is chambered out, and the wall of the chamber has an annular groove 29, for the reception of the packing 30, which may be constructed of any suitable material, preferably rubber, or a composition of rubber asbestos or canvas, or of any other similar or suitable material. Passing through the packing, and through an opening 31 at the inner end of the chamber of the outer end of the casting is a valve stem operating rod or member 32. This operating member or rod 32 is movably threaded at 33 into the outer end of the sleeve nut. It is obvious that by imparting rotary motion to the operating member or rod 32, the sleeve nut will be reciprocated, since it is prevented from rotary motion by the interengaging flanges 21 and 22. When the operating member or rod is so operated, it is obvious that the valve stem is moved longitudinally of the pipe section 3, thereby opening or closing the valve as may be desired. A collar 34 is secured upon the operating member or rod 32 by means of a transverse pin 35. This collar is arranged adjacent the shoulder 36 of the casting, that is adjacent the inner end of the chamber at the outer end of the casting. Interposed between the collar and the packing 30 is a washer 37, thereby preventing the packing from binding on the collar. A packing jamming sleeve nut 38 is threaded at 39 into the outer end of the chamber at the outer end of the casting, whereby the packing may be held in place. This packing jamming sleeve nut is counter-bored as shown at 40, and into which the reduced extension 41 of the operating rod (which is rectangular in cross-section) extends, that is in spaced concentric relation to the wall of the counter-bored portion of the jamming sleeve nut. A suitable key 42 provided with a handle 43 is provided. This key is adapted to extend into the counter-bored portion of the jamming sleeve nut, so that the rectangular chambered out part 44 of the key may receive the rectangular extension 41 of the operating member or rod 32. Obviously, by turning the key in one direction or the other, the operating rod or member 32 is given necessary revoluble movement, and by the connection of the rod with the sleeve nut 20, the valve stem may be moved longitudinally of the pipe section 3, the valve opening and closing according to the revoluble movements imparted to the rod or member 32. It is to be noted that the nut 15 which secures the valve 12 upon the extension 13 is circular, and telescopes into the opening 11, which adjoins the valve seat 10. By the nut so extending into the opening 11, it is obvious that sediment or foreign matter is prevented from seeping between the adjacent faces of the valve and the seat.

The invention having been set forth, what is claimed as new and useful is:

1. In a device as set forth, the combination with a tubular pipe section, of a casing connected to the pipe section adapted to be placed adjacent the inner wall of a building and provided with a valve seat, and an adjoining chamber, a valve guided in the chamber, toward and from and in cooperation with the seat, for controlling the passage of water through the chamber, and means adapted to be located exteriorly of the wall and having connection with the valve for operating the same, said connection between the operating means and the valve including a valve stem and a sleeve nut fixedly connected to the outer end of the stem, a casting connected to the pipe section provided with interior guides for the sleeve nut for guiding the same and the valve stem, said operating means including a member swiveled in the casting and connected to the sleeve nut to have relative movement therewith.

2. In a device as set forth, the combination with a tubular pipe section, of a casing connected to the pipe section and adapted to be placed adjacent the inner wall of a building and provided with a valve seat, and an adjoining chamber, a valve guided in the chamber, toward and from and in coöperation with the seat, for controlling the passage of water through the chamber, and means adapted to be located exteriorly of the wall and having connection with the valve for operating the same, the inner end of the chamber adjoining the valve seat being provided with an opening, the connection between the operating means and the valve including a valve stem having an extension at its inner end on which a valve is mounted, and a nut threaded on the extension to hold the valve in place, and adapted to fit the opening adjoining the valve seat, thereby preventing sediment or foreign matter from seeping between the adjacent walls of the seat and the valve, said connection also including a sleeve nut fixedly connected to the valve stem, a casting provided with an offset outlet and connected to the pipe section exteriorly of the wall, means on the interior of the casting and adjustably connected to the nut, whereby upon revoluble movement of the operating means a longitudinal movement may be imparted to the sleeve and the valve stem.

3. In a device as set forth, a pipe section adapted to be arranged transversely of a wall and having a valve seat and a coöperating valve at its inner end, a stem for the valve mounted for longitudinal movement in the pipe section, a casting exteriorly of the wall connected to the pipe section and provided with an offset outlet, an operating member mounted in the casting for revoluble movement, means guided in the casting and connecting the operating member and the stem, whereby upon revoluble movement of the member, a longitudinal movement may be imparted to the stem and its valve, whereby the valve may be opened or closed.

4. In a device as set forth, a pipe section adapted to be arranged transversely of a wall and having a valve seat and a coöperating valve at its inner end, a stem for the valve mounted for longitudinal movement in the pipe section, a casting exteriorly of the wall connected to the pipe section and provided with an offset outlet, an operating member mounted in the casting for revoluble movement, means guided in the casting and connecting the operating member and the stem, whereby upon revoluble movement of the member, a longitudinal movement may be imparted to the stem and its valve, whereby the valve may be opened or closed, and means for swiveling the revoluble operating member in the casting and preventing longitudinal movement thereof, and means for actuating said member.

5. In a device as set forth, the combination with a pipe section adapted to extend part way into a wall, a casing connected to the inner end of the pipe section and in contact with the inner face of the wall and provided with a valve seat, a valve including a stem coöperating with the seat, a casting extending into the wall from the outer face and connected to the pipe section and provided with an offset duct including a hose connection, a member rotatably mounted in the casting, means for swiveling the member in the casting, a coupling fixed to the valve stem and axially alined with and adjustably threaded to the member, means for holding the coupling from turning, and means for rotating said member for opening and closing the valve.

6. In a device as set forth, the combination with a pipe section adapted to extend part way into a wall, a casing connected to the inner end of the pipe section and in contact with the inner face of the wall and provided with a valve seat, a valve including a stem coöperating with the seat, a casting extending into the wall from the outer face and connected to the pipe section and provided with an offset duct including a hose connection, a member rotatably mounted in the casting, means for swiveling the member in the casting, a coupling fixed to the valve stem and axially alined with and adjustably threaded to the member, means for holding the coupling from turning, and means for rotating said member for opening and closing the valve, said holding means comprising spaced ribs on the coupling and diametrically opposite ribs on the wall of the casting to engage between the ribs of the coupling.

7. In a device as set forth, the combination with a pipe section adapted to extend part way into a wall, a casing connected to the inner end of the pipe section and in contact with the inner face of the wall and provided with a valve seat, a valve including a stem coöperating with the seat, a casting extending into the wall from the outer face and connected to the pipe section and provided with an offset duct including a hose connection, a member rotatably mounted in the casting, means for swiveling the member in the casting, a coupling fixed to the valve stem and axially alined with and adjustably threaded to the member, means for holding the coupling from turning, and means for rotating said member for opening and closing the valve, said swiveling means comprising a countersink formed in the casting, a collar on said member engaging the inner end of the countersink, a pin extending through the collar and the member, and means removably fixed into the countersink in contact with the collar, to prevent axial movement of the collar and the member when being rotated.

In testimony whereof I hereunto affix my signature in the presence of two witnesses.

JOHN A. HOAR.

Witnesses:
 GEORGE C. TRUE,
 GEORGE W. HOAR.